(12) United States Patent
Cintuglu et al.

(10) Patent No.: US 11,689,618 B2
(45) Date of Patent: Jun. 27, 2023

(54) DATA EXCHANGE AND PROCESSING SYNCHRONIZATION IN DISTRIBUTED SYSTEMS

(71) Applicant: Hitachi Energy Switzerland AG, Baden (CH)

(72) Inventors: Mehmet H. Cintuglu, Raleigh, NC (US); Dmitry Ishchenko, Raleigh, NC (US)

(73) Assignee: HITACHI ENERGY SWITZERLAND AG, Baden (CH)

( * ) Notice: Subject to any disclaimer, the term of this patent is extended or adjusted under 35 U.S.C. 154(b) by 75 days.

(21) Appl. No.: 16/718,685

(22) Filed: Dec. 18, 2019

(65) Prior Publication Data

US 2021/0194955 A1   Jun. 24, 2021

(51) Int. Cl.
G06F 15/173    (2006.01)
H04L 67/1095   (2022.01)
G06F 17/16     (2006.01)

(52) U.S. Cl.
CPC .......... H04L 67/1095 (2013.01); G06F 17/16 (2013.01)

(58) Field of Classification Search
CPC . H04L 67/1095; H04L 67/1074; H04L 67/12; H04L 67/10; G06F 17/16; H02J 13/00007; H02J 2203/10
USPC ........................................................ 709/248
See application file for complete search history.

(56) References Cited

U.S. PATENT DOCUMENTS

| | | | |
|---|---|---|---|
| 6,574,665 B1 | 6/2003 | Khotimsky | |
| 7,069,159 B2 * | 6/2006 | Zima | H02H 7/22 |
| | | | 702/57 |
| 9,658,260 B2 * | 5/2017 | Feng | G01R 19/2513 |
| 9,780,563 B2 * | 10/2017 | Kumagai | G01R 19/25 |
| 9,863,985 B2 * | 1/2018 | Giannakis | G06Q 20/145 |

(Continued)

FOREIGN PATENT DOCUMENTS

WO    2019050513 A1   3/2019

OTHER PUBLICATIONS

D.K. Molzahn et al., "A Survey of Distributed Optimization and Control Algorithms for Electric Power Systems," IEEE Transactions on Smart Grid, dated Nov. 2017, pp. 2941-2962, vol. 8, No. 6, IEEE, Piscataway, US.

(Continued)

*Primary Examiner* — Umar Cheema
*Assistant Examiner* — Tesfu N Mekonen
(74) *Attorney, Agent, or Firm* — Slater Matsil, LLP (57) ABSTRACT

Systems, methods, techniques and apparatuses of asynchronous communication is distributed systems are disclosed. One exemplary embodiment is a method determining, with a plurality of agent nodes structured to communicate asynchronously in a distributed system, a first set of iterations including an iteration determined by each of the plurality of agent nodes; determining, with a first agent node of the plurality of agent nodes, a local vector clock; receiving, with the first agent node, a first iteration of the first set of iterations and a remote vector clock determined based on the first iteration; updating, with the first agent node, the local vector clock based on the received remote vector clock; and determining a first iteration of a second set of iterations based on the first set of iterations after determining all iterations of the first set of iterations have been received based on the local vector clock.

17 Claims, 7 Drawing Sheets

(56) References Cited

U.S. PATENT DOCUMENTS

| | | | | |
|---|---|---|---|---|
| 2013/0304266 | A1* | 11/2013 | Giannakis | G06Q 20/145 700/286 |
| 2016/0071013 | A1* | 3/2016 | Benosman | H02J 3/0075 706/11 |
| 2018/0352414 | A1 | 12/2018 | Zhang et al. | |
| 2020/0036748 | A1* | 1/2020 | Tebekaemi | H04L 63/1441 |
| 2020/0202459 | A1* | 6/2020 | Chow | F24F 11/46 |

OTHER PUBLICATIONS

S. Kar et al., "Distributed State Estimation and Energy Management in Smart Grids: A Consensus+Innovations Approach," IEEE Journal of Selected Topics in Signal Processing, dated Dec. 2014, pp. 1022-1038, vol. 8, No. 6, IEEE, Piscataway, US.

L. Xie et al., "Fully Distributed State Estimation for Wide-Area Monitoring Systems," IEEE Transactions on Smart Grid, dated Sep. 2012, pp. 1154-1169, vol. 3, No. 3, IEEE, Piscataway, US.

R. De Azevedo et al., "Multiagent-Based Optimal Microgrid Control Using Fully Distributed Diffusion Strategy," IEEE Transactions on Smart Grid, dated Jul. 2017, pp. 1997-2008, vol. 8, No. 4, IEEE, Piscataway, US.

I. Khan et al., "Distributed Optimal Reactive Power Control of Power Systems," IEEE Access, dated Mar. 9, 2018, pp. 7100-7111, vol. 6, IEEE, Piscataway, US.

V. Kekatos et al., "Distributed Robust Power System State Estimation," IEEE Transactions on Power Systems, dated May 2013, pp. 1617-1626, vol. 28, No. 2, IEEE, Piscataway, US.

J. Guo et al., "On the Role of Communications Plane in Distributed Optimization of Power Systems," IEEE Transactions on Industrial Informatics, dated Jul. 2018, pp. 2903-2913, vol. 14, No. 7, IEEE, Piscataway, US.

E. Harmon et al., "The Internet of Microgrids: A Cloud-Based Framework for Wide Area Networked Microgrids," IEEE Transactions on Industrial Informatics, dated Mar. 2018, pp. 1262-1274, vol. 14, No. 3, IEEE, Piscataway, US.

W. Zhang et al., "Multiagent System-Based Integrated Solution for Topology Identification and State Estimation," IEEE Transactions on Industrial Informatics, dated Apr. 2017, pp. 714-724, vol. 13, No. 2, IEEE, Piscataway, US.

A. Minot et al., "A Distributed Gauss-Newton Method for Power System State Estimation," IEEE Transactions on Power Systems, dated Sep. 2016, pp. 3804-3815, vol. 31, No. 5, IEEE, Piscataway, US.

M. H. Cintuglu et al., "Development and Application of a Real-Time Testbed for Multiagent System Interoperability: A Case Study on Hierarchical Microgrid Control," IEEE Transactions on Smart Grid, dated May 2018, pp. 1759-1768, vol. 9, No. 3, IEEE, Piscataway, US.

B. Chen et al., "Cyber-physical perspective on smart grid design and operation," IET Cyber-Physical Systems: Theory & Applications, dated Jul. 20, 2018, pp. 129-141, vol. 3, No. 3, IET, Stevenage, UK.

M. Starke et al., "Implementation of a Publish-Subscribe Protocol in Microgrid Islanding and Resynchronization with Self-Discovery," IEEE Transactions on Smart Grid, dated Jan. 2019, pp. 361-370, vol. 10, No. 1, IEEE, Piscataway, US.

R. L. Scheiterer et al., "Synchronization Performance of the Precision Time Protocol in Industrial Automation Networks," IEEE Transactions on Instrumentation and Measurement, dated Jun. 2009, pp. 1849-1857, vol. 58, No. 6, IEEE, Piscataway, US.

A. H. Sayed, "Chapter 9—Diffusion Adaptation Over Networks," Academic Press Library in Signal Processing, dated 2014, pp. 323-453, vol. 3, Elsevier Ltd., Amsterdam, Netherlands.

X. Zhao et al., "Asynchronous Adaptation and Learning Over Networks—Part I: Modeling and Stability Analysis," IEEE Transactions on Signal Processing, dated Feb. 15, 2015, pp. 811-826, vol. 63, No. 4, IEEE, Piscataway, US.

X. Zhao et al., "Asynchronous Adaptation and Learning Over Networks—Part II: Performance Analysis," IEEE Transactions on Signal Processing, dated Feb. 15, 2015, pp. 827-842, vol. 63, No. 4, IEEE, Piscataway, US.

X. Zhao et al., "Asynchronous Adaptation and Learning Over Networks—Part III: Comparison Analysis," IEEE Transactions on Signal Processing, dated Feb. 15, 2015, pp. 843-858, vol. 63, No. 4, IEEE, Piscataway, US.

R. Olfati-Saber et al., "Consensus Problems in Networks of Agents With Switching Topology and Time-Delays," IEEE Transactions on Automatic Control, dated Sep. 2004, pp. 1520-1533, vol. 49, No. 9, IEEE, Piscataway, US.

F. Xiao et al., "Asynchronous Consensus in Continuous-Time Multi-Agent Systems With Switching Topology and Time-Varying Delays," IEEE Transactions on Automatic Control, dated Sep. 2008, pp. 1804-1816, vol. 53, No. 8, IEEE, Piscataway, US.

X. Liu et al., "Finite-Time Consensus of Multiagent Systems With a Switching Protocol," IEEE Transactions on Neural Networks and Learning Systems, dated Apr. 2016, pp. 853-862, vol. 27, No. 4, IEEE, Piscataway, US.

Y. Zheng et al., "Consensus of Hybrid Multi-Agent Systems," IEEE Transactions on Neural Networks and Learning Systems, dated Apr. 2018, pp. 1359-1365, vol. 29, No. 4, IEEE, Piscataway, US.

S. Tarkoma, "1.7 Communication Techniques," Publish/Subscribe Systems: Design and Principles, dated 2012, pp. 15-17, John Wiley & Sons, Ltd., West Sussex, UK.

L. Lamport, "Time, Clocks, and the Ordering of Events in a Distributed System," Communications of the ACM, dated Jul. 1978, pp. 558-565, vol. 21, No. 7, Association for Computing Machinery, New York, US.

M. H. Cintuglu et al., "Secure Distributed State Estimation for Networked Microgrids," IEEE Internet of Things Journal, date Oct. 2019, pp. 8046-8055, vol. 6, No. 5, IEEE, Piscataway, US.

M. H. Cintuglu et al., "Secure Distributed State Estimation for Networked Microgrids," U.S. Appl. No. 16/142,103 (pending unpublished US application stored in the IFW system).

* cited by examiner

TABLE I
Comparison of State Estimate Solutions

| BUS | Voltage magnitude (V) | | | Voltage phase angle (θ) | | |
| --- | --- | --- | --- | --- | --- | --- |
| | Process 400 | Process 200 | Actual | Process 400 | Process 200 | Actual |
| 1 | 1.1238 | 1.0432 | 1.0091 | -2.8929 | -2.6856 | -2.5825 |
| 2 | 1.0958 | 1.0173 | 0.9862 | -5.7125 | -5.3030 | -5.1727 |
| 3 | 1.0758 | 0.9986 | 0.9709 | -7.7387 | -7.1840 | -7.0541 |
| 4 | 1.0650 | 0.9886 | 0.9625 | -11.1457 | -8.3069 | -8.1548 |
| 5 | 1.0420 | 0.9673 | 0.9438 | -12.5115 | -10.3468 | -10.1190 |
| 6 | 1.0265 | 0.9529 | 0.9325 | -12.5115 | -11.6147 | -11.2743 |
| 7 | 1.0168 | 0.9440 | 0.9282 | -13.1660 | -12.2222 | -11.5653 |

Fig. 7

DATA EXCHANGE AND PROCESSING SYNCHRONIZATION IN DISTRIBUTED SYSTEMS

STATEMENT REGARDING FEDERALLY SPONSORED RESEARCH OR DEVELOPMENT

This invention was made with U.S. Government support under Contract No. DE-0E000831 awarded by the Department of Energy. The Government has certain rights in this invention.

BACKGROUND

The present disclosure relates generally to distributed systems. Centrally computed algorithms are being increasingly substituted with distributed control algorithms whereby agent nodes of a distributed system each perform a portion of an algorithm while exchanging data between agent nodes. Conventional execution of these distributed control algorithms requires synchronous communication between agent nodes. However, distributed systems may use asynchronous communication networks between nodes. Alternatively, a synchronous communication network of a distributed system may experience asynchrony due to system failure or communication delay. There remain unmet needs including executing distributed control algorithms within distributed systems that communicate asynchronously. In view of these and other shortcomings in the art, there is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY OF THE DISCLOSURE

Exemplary embodiments of the disclosure include unique systems, methods, techniques and apparatuses for synchronous communication in distribution systems. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
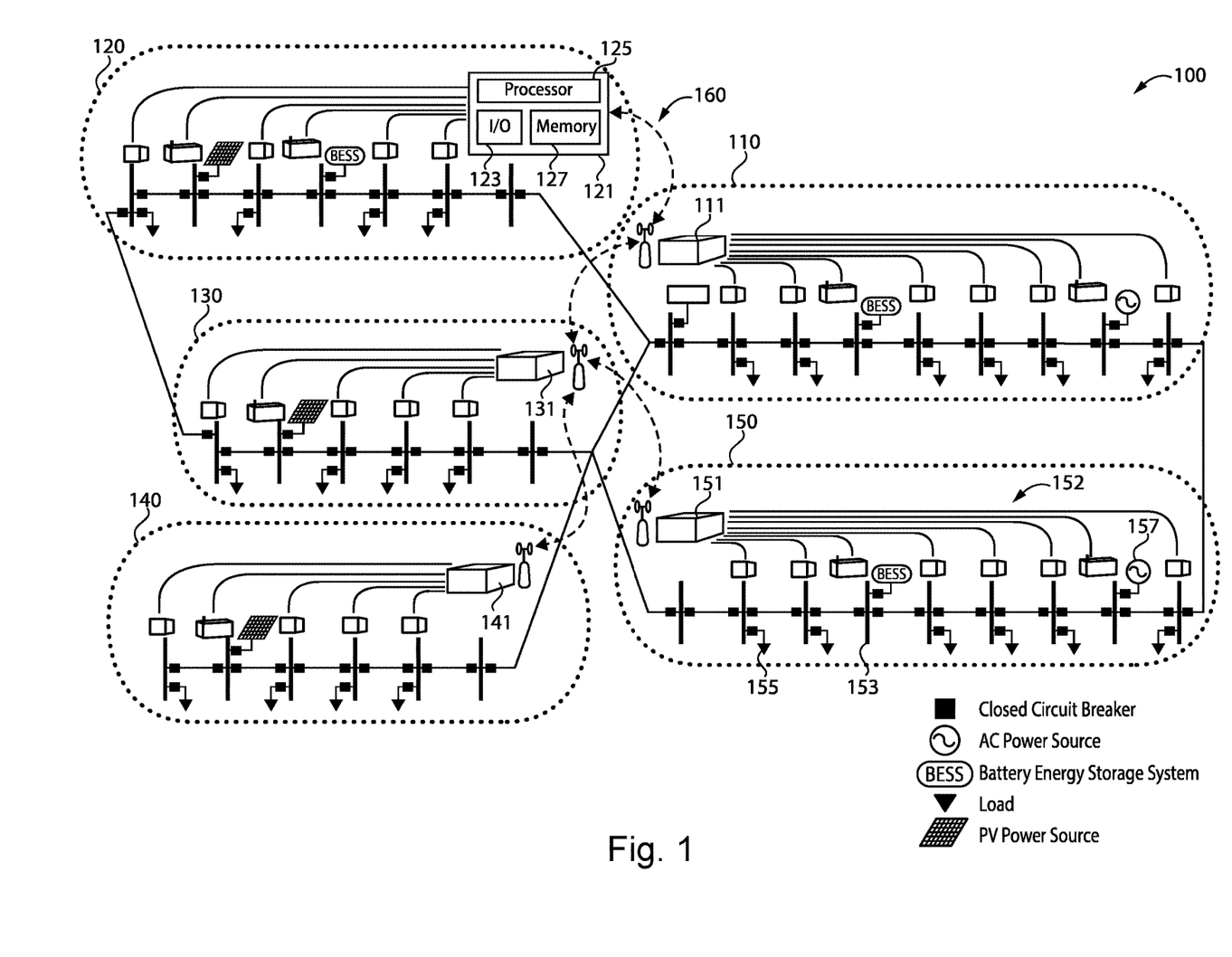
FIG. 1 illustrates an exemplary microgrid system including an asynchronous communication network.

With reference to FIG. 1, there is illustrated an exemplary networked microgrid system 100. It shall be appreciated that system 100 may be implemented in a variety of industrial automation or power system applications including utility grid distribution systems, industrial plant distribution systems, and vehicular distribution systems, to name but a few examples. It shall be appreciated that the topology of system 100 is illustrated for the purpose of explanation and is not intended as a limitation of the present disclosure. Although system 100 is illustrated with a single line diagram, system 100 may be structured to transmit single phase alternating current (AC) power, multiphase AC power, or direct current (DC) power.

System 100 includes microgrids 110, 120, 130, 140 and 150. Each microgrid includes at least one load and at least one power source coupled to one of a plurality of buses. Each microgrid includes a plurality of field devices structured to measure electrical or physical characteristics of the microgrid. For example, microgrid 150 includes a plurality of buses including bus 153, a plurality of loads including load 155, an AC power source 157, and a plurality of field devices 152.

AC power source 157 may include a solar panel array, a wind turbine, a natural gas generator, or any other device or system structured to generate power. Load 155 may be any type of device or system structured to consume power. The plurality of field devices 152 may include voltage sensors, intelligent electronic devices (IEDs), remote terminal units (RTUs), relays, reclosers, current sensors, voltage transformers, and current transformers, to name but a few examples.

Each microgrid also includes a microgrid control system, also known as an agent node, coupled to the plurality of field devices by way of a plurality of communication channels. For example, microgrid 150 includes microgrid control system 151, which is coupled to the plurality of field devices 152 by way of a plurality of communication channels.

Each microgrid control system includes an input/output device, a processing device, and a memory device. For example, microgrid control system 121 includes an input/output device 123, a processing device 125, and a memory device 127. Microgrid control system 121 may be a stand-alone device, an embedded system, or a plurality of devices structured to perform the functions described with respect to system 121. For example, system 121 may be incorporated into a microgrid supervisory control and data acquisition (SCADA) gateway.

Input/output device 123 enables microgrid control system 121 to communicate with local field devices or other microgrids. Input/output device 123 may include a network adapter, network credential, interface, or a port (e.g., a USB port, serial port, parallel port, an analog port, a digital port, VGA, DVI, HDMI, FireWire, CAT 5, Ethernet, fiber, or any other type of port or interface), to name but a few examples. Input/output device 123 may include more than one of these adapters, credentials, or ports, such as a first port for receiving data and a second port for transmitting data.

Processing device 125 may include one or multiple processors, Arithmetic-Logic Units (ALUs), Central Processing Units (CPUs), Digital Signal Processors (DSPs), or Field-programmable Gate Arrays (FPGAs), to name but a few examples. For forms of processing devices with multiple processing units, distributed, pipelined, or parallel processing may be used. Processing device 125 may be dedicated to performance of only the operations described herein or may be used in one or more additional applications. Processing device 125 may be of a programmable variety that executes algorithms and processes data in accordance with operating logic 808 as defined by programming instructions (such as software or firmware) stored in memory 127. Alternatively or additionally, operating logic for processing device 125 is at least partially defined by hardwired logic or other hardware. Processing device 125 may comprise one or more components of any type suitable to process the signals received from input/output device 123 or elsewhere, and provide desired output signals. Such components may include digital circuitry, analog circuitry, or a combination of both.

Memory device 127, also known as a computer readable medium, may be of one or more types of memory, such as a solid-state variety, electromagnetic variety, optical variety, or a combination of these forms, to name but a few examples. Furthermore, memory device 127 may be volatile, nonvolatile, transitory, non-transitory, or a combination of these types, and some or all of memory device 127 may be of a portable variety, such as a disk, tape, memory stick, or cartridge, to name but a few examples. In addition, memory device 127 may store data that is manipulated by operating logic of processing device 125, such as data representative of signals received from and/or sent to input/output device 123 in addition to or in lieu of storing programming instructions defining operating logic, just to name one example. Memory device 127 may be included with processing device 125 and/or coupled to processing device 125. It shall be appreciated that the other microgrid control systems of system 100 may also include components described herein with respect to microgrid control system 121.

Microgrid control systems 111, 121, 131, 141, and 151 are structured to communicate by way of asynchronous communication network 160 including communication channels coupled with one or more neighboring microgrid control systems. Network 160 may communicate asynchronously because the microgrid control systems do not synchronize to a common time source, such as a GPS time signal, or because network 160 is a synchronized communication network experiencing communication delays. In the illustrated embodiment, microgrid control system 111 communicates with microgrid control systems 121 and 131; microgrid control system 121 communicates only with microgrid control system 111; microgrid control system 131 communicates with microgrid control systems 111, 141, and 151; microgrid control system 141 communicates only with microgrid control system 131; and microgrid control system 151 communicates only with microgrid control system 131.

The communication channels of network 160 between the microgrid control systems may be wired or wireless. Each communication channel of network 160 may use standardized communication protocols, such as IEC 61850, OPC UA, Pub-Sub, XMPP, or DDS, to name but a few examples. In certain embodiments where standardized communication protocols are insufficient to define behavior of microgrids for distributed state estimation, semantics of the exchanged messages may be defined using common knowledge representations.

For example, the Foundation for Intelligent Physical Agents (FIPA) standard implements Agent Communication Language (ACL) to describe the semantics of exchanged messages. The content of an ACL message includes the object of the action and parameters passed through the message. Sender and receiver parameters designate the name of the sender and intended recipient agents. ACL messages express communicative acts such as informing, requesting, refusing, subscribing, and propagating, to name but a few examples. IEC 61850 communication protocols may be extended using non-standardized IEC 61850 logical nodes as Abstract Communication Service Interface (ACSI) based on ACL communication acts, and can be mapped to GOOSE messages.

Each microgrid control system is structured to receive measured electrical and physical characteristics of the corresponding microgrid from the field devices of the microgrid, operate controllable devices of the microgrid, and protect the devices coupled to the microgrid from faults and other conditions. The microgrid control systems, collectively, are structured to execute at least one distributed control application by recursively determining iterations and sharing the determined iterations with other microgrid control systems using the asynchronous communication network 160.

For the purposes of illustration, a distributed control application for estimating states in system 100 shall now be described. State estimation is a process whereby electrical or physical characteristics of all microgrids in networked microgrid system 100 are estimated using input data related to the electrical or physical characteristics of the networked microgrid system to be estimated. The state estimation may include estimating the bus voltages for all buses in networked microgrid system 100, as well as estimating current flow through all microgrids in networked microgrid system 100.

First, each microgrid control system determines a first iteration using local data from the field devices of the corresponding microgrid. The first iteration may be determined using recursive least squares, to name but one example. Vector set (1) includes a local state estimation vector for every microgrid of system 100, each vector including an initial voltage and phase angle $x_1^{(n)}(0)$ estimate for each bus in the microgrid. At the $0^{th}$ iteration, each microgrid sets the initial estimate vector $X_{MGn}(0)$.

$$x_{MG_{110}}^T(0)=[x_1^{(n)}(0)x_2^{(n)}(0)x_3^{(n)}(0)x_4^{(n)}(0)x_5^{(n)}(0)x_6^{(n)}(0)x_7^{(n)}(0)x_8^{(n)}(0)x_9^{(n)}(0)]$$

$$x_{MG_{120}}^T(0)=[x_1^{(n)}(0)x_2^{(n)}(0)x_3^{(n)}(0)x_4^{(n)}(0)x_5^{(n)}(0)x_6^{(n)}(0)]$$

$$x_{MG_{130}}^T(0)=[x_1^{(n)}(0)x_2^{(n)}(0)x_3^{(n)}(0)x_4^{(n)}(0)x_5^{(n)}(0)x_6^{(n)}(0)x_7^{(n)}(0)]$$

$$x_{MG_{140}}^T(0)=[x_1^{(n)}(0)x_2^{(n)}(0)x_3^{(n)}(0)x_4^{(n)}(0)x_5^{(n)}(0)x_6^{(n)}(0)]$$

$$x_{MG_{150}}^T(0)=[x_1^{(n)}(0)x_2^{(n)}(0)x_3^{(n)}(0)x_4^{(n)}(0)x_5^{(n)}(0)x_6^{(n)}(0)x_7^{(n)}(0)x_8^{(n)}(0)x_9^{(n)}(0)] \quad (1)$$

Next, each microgrid control system transmits its first iteration to the other microgrid control systems while receiving all the first iterations determined by the other microgrid control systems. Using the set of first iterations, each microgrid control system combines the first iterations into a global estimate vector $X_{MGglobal}$ using vector set (1)

$$x_{MGglobal}(0) = [x_{MG_{110}}{}^T(0) x_{MG_{120}}{}^T(0) x_{MG_{130}}{}^T(0) x_{MG_{140}}{}^T (0) x_{MG_{150}}{}^T(0)]^T \quad (2)$$

Using the global estimate vector $x_{MGglobal}$, the microgrid control systems of the networked microgrid system use a diffusion strategy and peer-to-peer iterative communication to perform state estimation. The diffusion algorithm considers a collection of N microgrid control systems estimating the same parameter vector, $\omega^0$, size of N×1. Diffusion algorithms employ two types of strategies: Combine-then-Adapt (CTA) and Adapt-then-Combine (ATC). ATC can be summarized as follows: At every iteration instant i, ATC strategy performs two steps. The first step is an information exchange step where microgrid control system k receives from its neighbors their moments $\{R_{u,l}, r_{du,l}\}$. Microgrid control system k combines this information and uses it to update its existing estimate $\omega_{k,i-1}$ to an intermediate value $x_{MGglobal_{k,i}}$. All other microgrid control systems in the networked microgrids system are performing a similar step and updating their estimates $\{\omega_{k,i-1}\}$ into intermediate estimates $\{x_{MGglobal_{k,i}}\}$ by using information from their neighbors. The second step is an aggregation step where microgrid control system k combines the intermediate estimates of its neighbors to obtain its update estimate $\omega_{k,i}$.

Each iteration determined by agent microgrid control system k is determined using equation set (3) where $X_{MGglobal_{k,i}} \in \mathbb{R}$ denotes the state of agent microgrid control system k at iteration i, $\omega_{k,i}$ is the intermediate variable for agent k at iteration i, $\mu_k$ is a nonnegative updating parameter, also known as a step size, of agent microgrid control system k, and $\nabla_\omega J_l(\omega_{k,i-1})$ is the stochastic gradient for agent microgrid control system k of the intermediate state $\omega$ at iteration i.

$$ATC_{MG\_State} = \begin{cases} x_{MGglobal_{k,i}} = \omega_{k,i-1} - \mu_k \nabla_\omega J_l(\omega_{k,i-1}) \\ \omega_{k,i} = \sum_{l \in N_k} a_{kl} X_{MGglobal_{k,i-1}} \end{cases} \quad (3)$$

In certain embodiments, $\mu_k$ is 0.2. In other embodiments, $\mu_k$ is within a range from 0 to 1. The stochastic gradient is the difference of $\omega$ from one iteration to the other. Each microgrid control system keeps track of its gradient and updates the combination of all of its neighbors accordingly.

Coefficient $a_{kl}$ of trust matrix A is a trust factor of a that each microgrid control system places on the other. The coefficients do not need to be symmetric, i.e., $a_{kl} \neq a_{lk}$, but each coefficient must be greater than or equal to zero, the sum of trust factors assigned by one microgrid control system to neighbors must equal one, and the trust factor assigned to a microgrid control system which is not a neighbor must be zero.

$$a_{kl} \geq 0, \sum_{k=1}^n a_{kl} = 1 \text{ and } a_{kl} = 0, \text{ if } l \notin N_k \quad (4)$$

Trust factors may be assigned such that a trust factor between an agent microgrid control system and its neighbor is equal to the inverse of the maximum of the number of connected microgrid control systems to either the agent microgrid control system or the neighbor microgrid control system, and a trust factor between a microgrid control system and the microgrid control system itself is equal to one minus the sum of the trust factors between the microgrid control system and its neighbors. The equation set (5) illustrates the described assignment, where $n_k$ is the number of connected microgrid control systems of agent microgrid control system k including microgrid control system k itself, $n_l$ is the number of connected microgrid control systems of neighbor microgrid control system l including microgrid control system l itself, and $N_l$ is the neighboring nodes of neighbor l.

$$a_{kl} = \begin{cases} \frac{1}{\max(n_k, n_l)}, k \in N_l \setminus \{l\} \\ 1 - \sum_{k \in N_l \setminus \{l\}} a_{kl}, k = l \end{cases} \quad (5)$$

In other words, the trust factor from k to l depends on the maximum number of neighbors either microgrid control system has, and the self-weight brings the total of each row (and column) in A to one. The trust matrix may be recalculated in response to a change in system topology, but otherwise remains static.

Using equation set (5), each microgrid control system calculates a trust matrix. The following matrices show the topology matrix of system 100 being converted into a trust matrix using equation set (5).

$$\begin{vmatrix} 1 & 1 & 1 & 0 & 0 \\ 1 & 1 & 0 & 0 & 0 \\ 1 & 0 & 1 & 1 & 1 \\ 0 & 0 & 1 & 1 & 0 \\ 0 & 0 & 1 & 0 & 1 \end{vmatrix} \rightarrow \begin{vmatrix} 0.4167 & 0.3333 & 0.2500 & 0.0000 & 0.0000 \\ 0.3333 & 0.6667 & 0.0000 & 0.0000 & 0.0000 \\ 0.2500 & 0.0000 & 0.2500 & 0.2500 & 0.2500 \\ 0.0000 & 0.0000 & 0.2500 & 0.7500 & 0.0000 \\ 0.0000 & 0.0000 & 0.2500 & 0.0000 & 0.7500 \end{vmatrix} \quad (6)$$

After determining each new iteration, the microgrid control systems transmit their new iteration to the other microgrid control systems and receive the new iterations from each of the other microgrid control systems. The microgrid control system compares its own new iteration with the new iterations determined by the other microgrid control systems to determine whether the most recent set of iterations has converged, that is the standard deviation of the iterations is below a threshold. For example, the threshold may be, $\sigma < 0.001$ or $\sigma < 0.1$, to name but a few examples. The microgrid control systems continue to determine new iterations of the state estimation until the final iteration converges. The final iteration, which is the completed state estimation, may be used for market simulations, stability analysis, and demand response, to name but a few examples.

Figure 2:
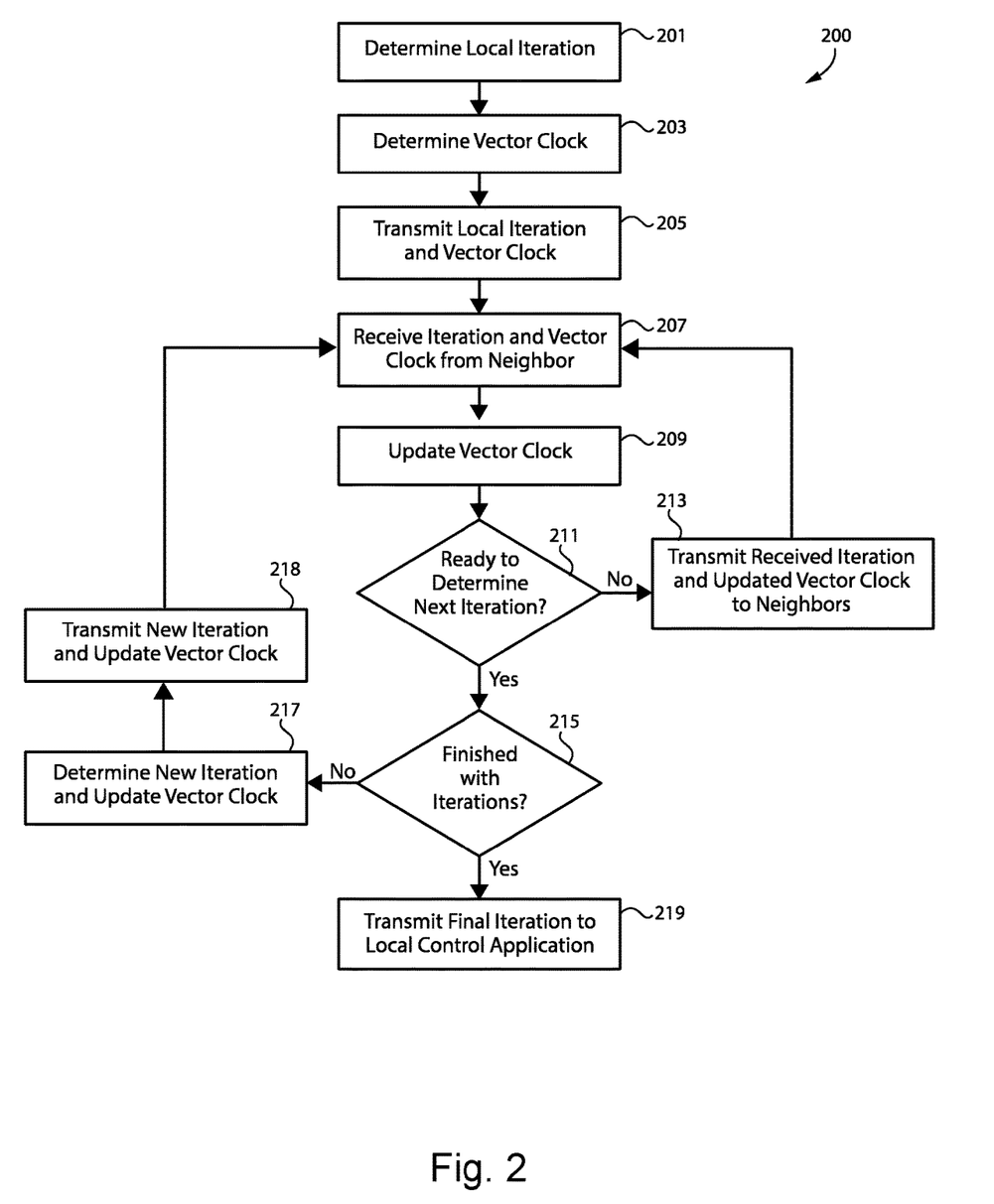
FIG. 2 is a flowchart illustrating an exemplary process for data exchange in an asynchronous communication network.

With reference to FIG. 2, there is illustrated a process 200 for exemplary data exchange between agent nodes during the execution of a distributed application using an asynchronous communication network. For example, where the distributed application is a distributed state estimation application using a recursive algorithm such as weighted least squares, iterations determined by process 200 may be iterations of a state estimation that will be recursively determined until the iterations determined by each agent node converge.

It shall be appreciated that while process 200 is directed to steps taken by one agent node of a distribution system, each of the agent nodes in the distribution system executes process 200 in order to execute the distribution application. It shall be further appreciated that a number of variations and modifications to process 200 are contemplated, including, for example, the omission of one or more aspects of process 200, the addition of further conditionals and operations, and/or the reorganization or separation of operations and conditionals into separate processes.

Process 200 begins at operation 201 where the agent node determines a first iteration using data not received from other agent nodes. The first iteration may be determined using measurements received from measuring devices in direct communication with the agent node. The iteration is one iteration of a first set of iterations that are generated by the agent nodes of the distribution system.

Process 200 proceeds to operation 203 where the agent node determines a local vector clock by either generating or updating the local vector clock. The local vector clock includes a plurality of elements, wherein one element corresponds to the number of iterations determined by the agent node and the other elements correspond to the number of received iterations determined by each of the other agent nodes of the distribution system. For example, the local vector clock for the agent node may be represented by vector $V_k$ where element $V_k[k]$ is the number of iterations that have been determined by the agent node and element $V_k[l]$ is the number of iterations received by the agent node and determined by another agent node of the distribution system, agent node l. Every time the agent node determines a new iteration, $V_k[k]$ is incremented by one. Every time the agent node receives an iteration from agent node l, $V_k[l]$ is incremented by one.

Process 200 proceeds to operation 205 where the agent node transmits the first iteration and the local vector clock to one or more neighboring agent nodes of the distribution system. Neighboring agent nodes are agent nodes of the distribution system in direct communication with the agent node.

Process 200 proceeds to operation 207 where the agent node receives an iteration of the first set of iterations determined by agent node l and a remote vector clock determined by agent node l. In certain embodiments, the agent node may receive more than one iteration of the first set of iterations from agent node l and a remote vector clock reflecting the multiple iterations being received by the agent node.

Process 200 proceeds to operation 209, where the agent node updates the local vector clock based on the received remote vector clock. The agent node may update the local vector clock using the following equation:

$$V_k[l] = \max(V_k[l], V_l[l]) \quad (7)$$

Process 200 proceeds to conditional 211 where the agent node determines whether the agent node has received all iterations of the first set of iterations from the other agent nodes based on the updated vector clock. For example, the agent node may determine all iterations of the first set of iterations have been received by determining each element of $V_k$ is at least one. If the agent node has received all iterations of the first set of iterations, process 200 proceeds to conditional 215. If the agent node has not received all iterations of the first set of iterations, process 200 proceeds to operation 213.

During operation 213, the agent node transmits the iteration or iterations received in operation 207 and the local vector clock updated in operation 209 to one or more neighboring agent nodes. Process 200 then proceeds to operation 207. Process 200 continues in a loop of operation 207, operation 209, conditional 211, and operation 213 until the agent node receives all the iterations of the first set of iterations.

At conditional 215, the agent node determines whether the most recently determined iteration by the agent node is a final iteration. For example, an agent node may need to determine if the most recently completed set of iterations has not converged. If the agent node needs to determine a new iteration, process 200 proceeds to operation 217. If the agent node does not need to determine a new iteration, process 200 proceeds to operation 219.

During operation 217, the agent node determines a new iteration based on the first set of iterations in response to determining the most recently determined iteration by the agent node is not a final iteration. The agent node also updates the local vector in response to determining the new iteration. The new iteration is an iteration of a second set of iterations determined by the agent nodes of the distribution system. In certain embodiments, the agent node determines the new iteration before at least one other agent node has received all iterations of the first set of iterations.

Process 200 proceeds to operation 218 where the agent node transmits the new iteration and updated local vector clock from operation 217 to one or more neighboring agent nodes. Process 200 then returns to operation 207. Process 200 continues to receive iterations from other agent nodes, updating the vector clock, and determining new iterations based on the updated vector clock until the agent node determines the most recently determined new iteration is the final iteration.

During operation 219, the agent node transmits the final iteration to local control applications in order to operate the distribution system based on the final iteration. For example, where the final iteration is a microgrid state estimation, the agent node may change controllable device set points based on the final iteration.

Figure 3:
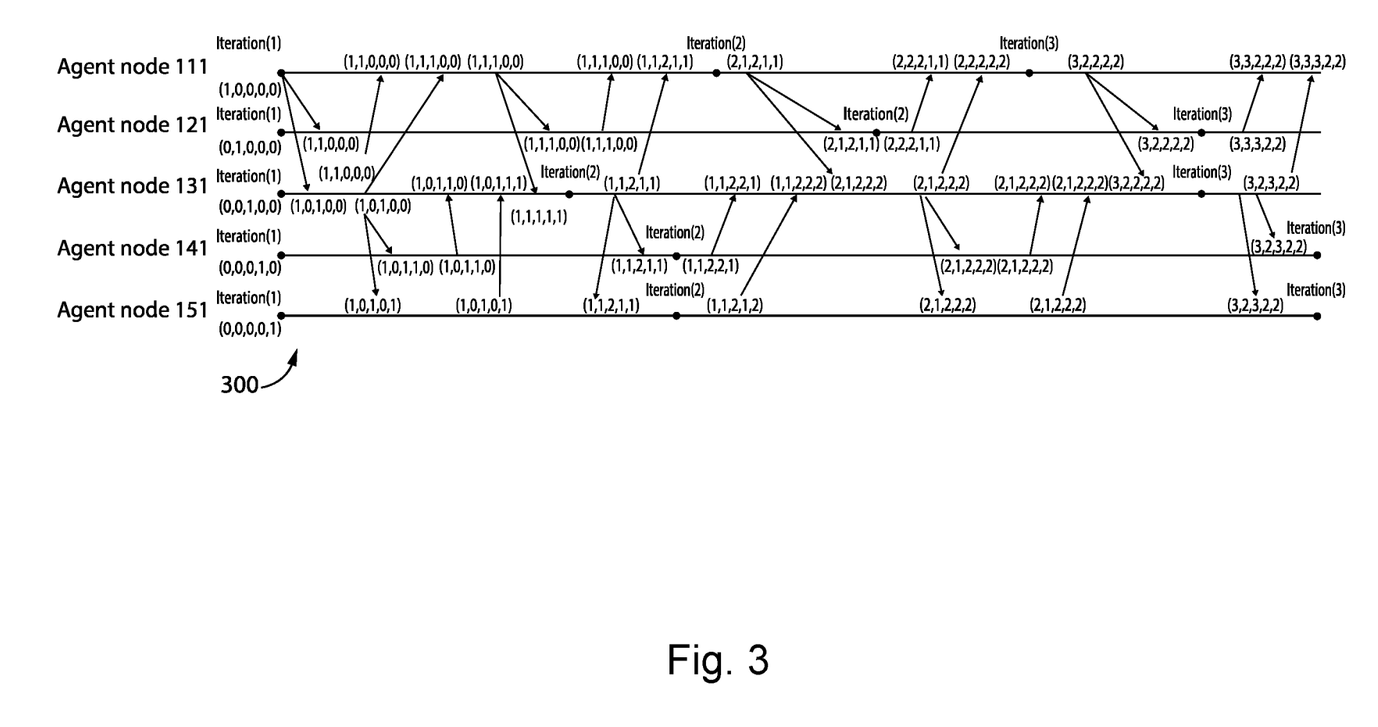
FIG. 3 is a sequence diagram illustrating the exemplary process illustrated in FIG. 2.

With reference to FIG. 3, there is a sequence diagram 300 illustrating the exemplary data exchange process 200 in FIG. 2 executed by system 100 in FIG. 1. As shown in diagram 300, each agent node determines three iterations. While the first iterations for each agent node are determined simultaneously, the second and third iterations are determined by the agent nodes at different times. Using asynchronous communication network 160, each agent node receives a complete set of iterations at different times, determines the new iteration using the complete set of iterations, and then transmits the new iteration with an updated vector clock to the other agent nodes.

Figure 4:
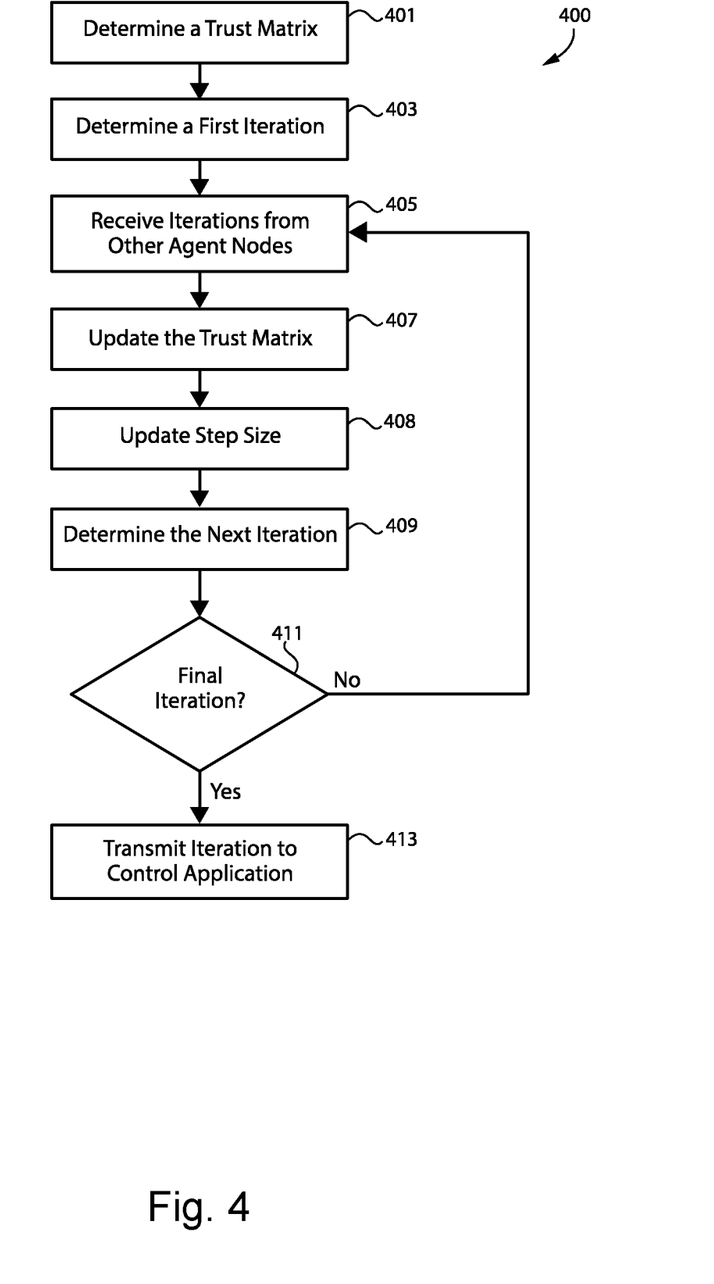
FIG. 4 is a flowchart illustrating another exemplary process for data exchange in an asynchronous communication network.

With reference to FIG. 4, there is illustrated a process 400 for exemplary data exchange between agent nodes during the execution of a distributed application using an asynchronous communication network. For example, where the distributed application is a distributed state estimation application using a recursive algorithm such as weighted least squares, iterations determined by process 400 may be iterations of a state estimation that will be recursively determined until the iterations determined by each agent node converge.

It shall be appreciated that while process 400 is directed to steps taken by one agent node of a distribution system, each of the agent nodes in the distribution system executes process 400 in order to execute the distribution application. It shall be further appreciated that a number of variations and modifications to process 400 are contemplated, including, for example, the omission of one or more aspects of process 400, the addition of further conditionals and operations, and/or the reorganization or separation of operations and conditionals into separate processes.

Unlike process 200, process 400 does not wait for an agent node to receive all iterations of a set of iterations before determining a new iteration. Instead, as described in more detail below, each agent node determines a new iteration using the iterations received during a ticker period preceding the time for determining the new iteration.

Process 400 begins at operation 401 where the agent node determines a trust matrix A including a plurality of trust factors, each trust factor corresponding to a weight applied to iterations of the plurality of iterations determined by one of the plurality of agent nodes. The weights may be determined using equation set (5), to name but one example.

Process 400 proceeds to operation 403 where the agent node determines a first iteration. The agent node may determine the first iteration using local data or measurements that are not transmitted through another agent node. For example, the agent node may determine the first iteration using the following equation set, where $\psi_{k,i} \in \mathbb{R}$ denotes the state of agent microgrid control system k at iteration i, $\omega_{k,i}$ is the intermediate variable for agent k at iteration i, $\mu_k$ is a nonnegative step size of agent microgrid control system k, $a_{lk}$ is the trust factor for iterations determined by agent node l and received by agent node k, and $\nabla_\omega J_l(\omega_{k,i-1})$ is the stochastic gradient for agent microgrid control system k of the intermediate state $\omega$ at iteration i:

$$\psi_{k,i} = \omega_{k,i-1} - \mu_k \Sigma_{l \in N_k} [\nabla_\omega J_l(\omega_{k,i-1})]^*$$

$$\omega_{k,i} = \Sigma_{l \in N_k} a_{lk} \psi_{l,i} \quad (8)$$

Process 400 proceeds to operation 405 where the agent node receives one or more iterations from one or more of the other agent nodes during a first ticker period. The first ticker period begins after the first iteration and ends before the beginning of operation 407.

Process 400 proceeds to operation 407 where the agent node updates the trust matrix based on the iterations received during operation 405. To update the trust matrix, the agent node decreases any weight applied to iterations received from an agent node that did not transmit an iteration to the agent node during the ticker period. Updating the trust matrix may also include increasing the weight applied to iterations determined by the agent node in an amount equal to the amount any weights were decreased. For example, the trust matrix may be updated using the following equation set:

$$a_{lk} = \begin{cases} \text{if } (\psi_{l,i} \neq \psi_{l,i-1}) \ \& \ (\psi_{l,i} \neq 0) & a_{lk} > 0 \\ \text{otherwise} & a_{lk} = 0 \end{cases} \quad (9)$$

$$a_{kk} = 1 - \sum_{l \in N_k \backslash \{k\}} a_{lk}$$

Process 400 proceeds to operation 408 where the agent node updates the step size based on the iterations received during the ticker period in operation 403. To update the step size, the agent node decreases any step size applied to iterations received from an agent node that did not transmit an iteration to the agent node during the ticker period. For example, the step size may be updated using the following equation set:

$$a_{lk} = \begin{cases} \text{if } (\psi_{l,i} \neq \psi_{l,i-1}) \ \& \ (\psi_{l,i} \neq 0) & \mu_k > 0 \\ \text{otherwise} & \mu_k = 0 \end{cases} \quad (10)$$

Process 400 proceeds to operation 409 where the agent node determines a second iteration after the ticker period based on the iterations received during operation 405 and the updated trust matrix from operation 407. In certain embodiments, the agent node determines a second iteration based in part on the step size updated in operation 408. For example, the agent node may determine the second iteration using equation set (8).

Process 400 proceeds to conditional 411 where the agent node determines if the most recently determined iteration is the final iteration. For example, the agent node compares its own new iteration with other iterations received from other agent nodes to determine whether they have converged, that is the standard deviation of the iterations is below a threshold. For example, the threshold may be, $\sigma < 0.001$ or $\sigma < 0.1$, to name but a few examples. In certain embodiments, the agent node may determine the most recent iteration is the final iteration by determining whether the agent node has completed a fixed number of iterations.

If the most recently determined iteration is not the final iteration, process 400 proceeds to operation 405 and process 400 repeatedly receives new iterations during a new ticker period, updates the trust matrix based on the new iterations, and determines a new iteration using the iterations received during the new ticker period and the updated trust matrix until the agent node determines the most recent iteration is the final iteration.

During operation 413, the agent node transmits the final iteration to local control applications in order to operate the distribution system based on the final iteration. For example, where the final iteration is a microgrid state estimation, the agent node may change controllable device set points based on the final iteration.

Figure 5:
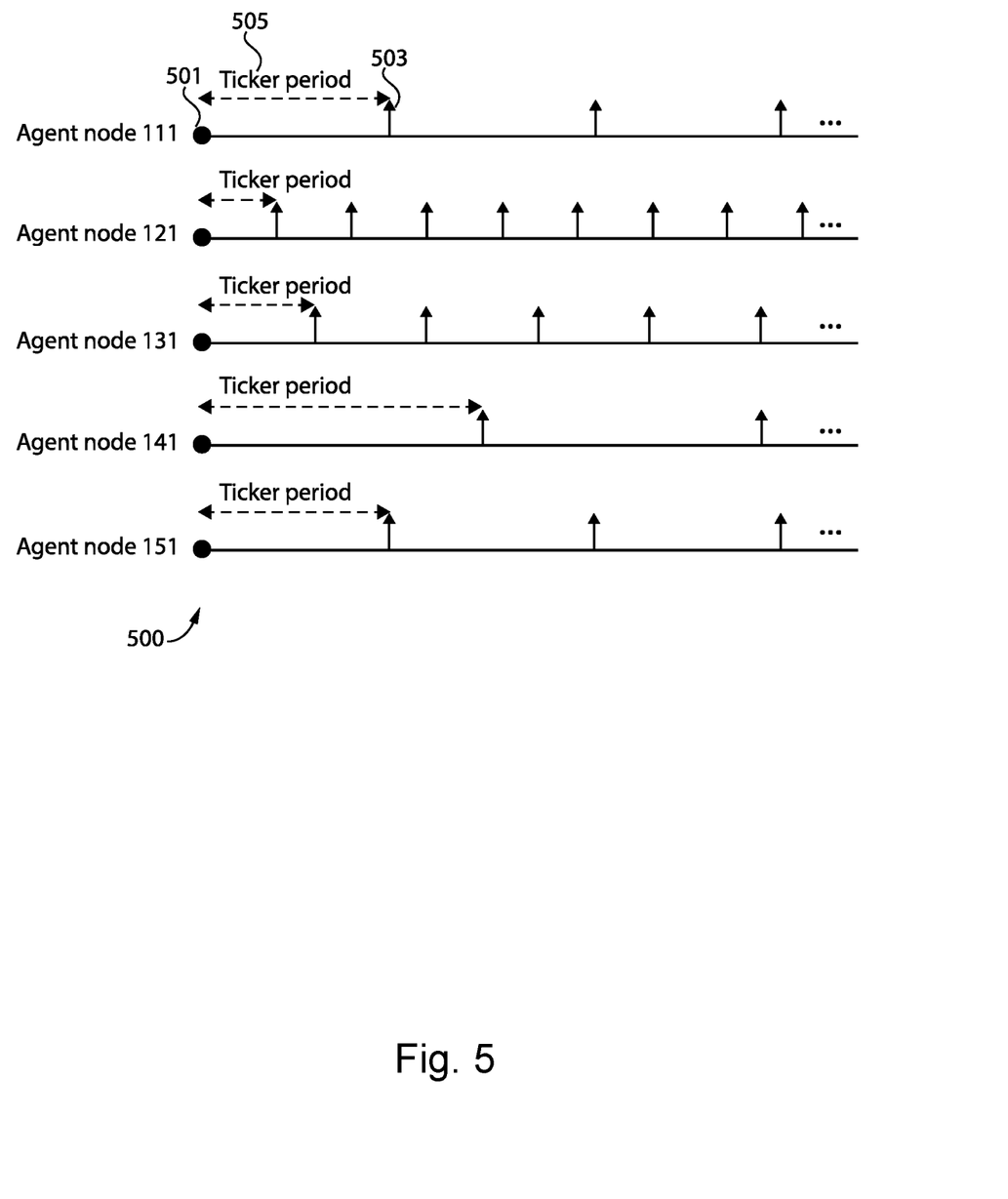
FIG. 5 is a sequence diagram illustrating the exemplary process illustrated in FIG. 4

With reference to FIG. 5, there is a sequence diagram 500 illustrating exemplary data exchange process 400 in FIG. 4 executed by system 100 in FIG. 1. Diagram 500 illustrates a series of iterations performed by each agent node separated by a plurality of ticker periods. For example, agent node 121 determines iterations 501 and 503 separated in time by ticker period 505. As illustrated in diagram 500, the plurality of ticker periods for each agent node may be an equal length in time. In other embodiments, the plurality of ticker periods for an agent node may include ticker periods of varying lengths in time. As illustrated in diagram 500, the ticker periods for agent nodes 121, 131, and 141 are different lengths in time compared to the ticker periods for agent node 111.

Figure 6:
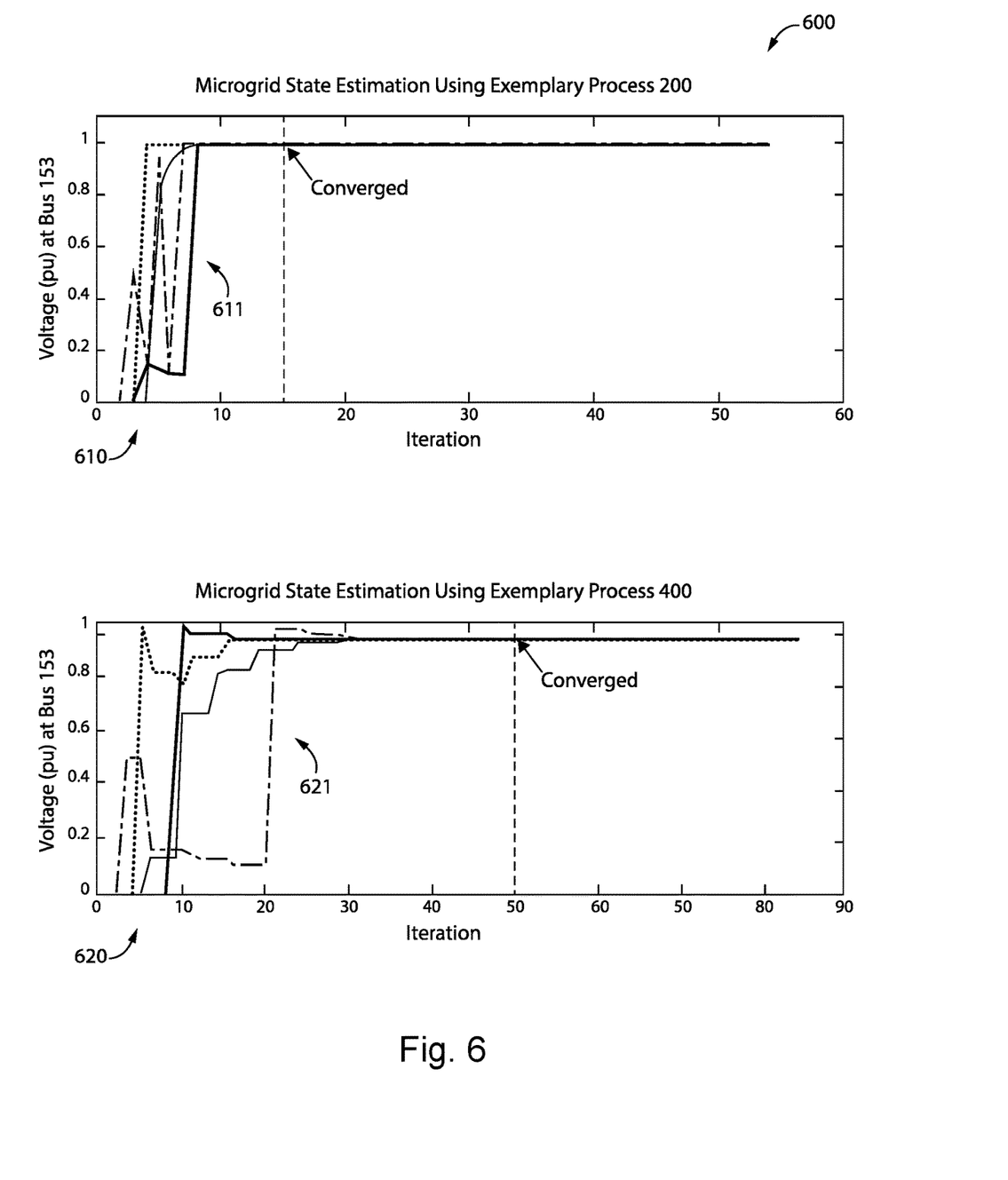
FIG. 6 is a set of graphs illustrating state estimation in the exemplary microgrid of FIG. 1 based on the exemplary processes illustrated in FIGS. 2 and 4.

With reference to FIG. 6, there is a plurality of graphs 600 including graph 610 and graph 620. Graph 610 illustrates the state estimation of bus 153 in system 100 using the exemplary data exchange process 200 in FIG. 2. Graph 610 includes a plurality of estimation lines 611, each line representing the values of each iteration determined by one agent node. By the $15^{th}$ iteration determined by each agent node, the state estimation has converged.

Graph 620 illustrates the state estimation of bus 153 in system 100 using the exemplary data exchange process 400 in FIG. 4. Graph 620 includes a plurality of estimation lines 621, each line representing the values of each iteration determined by one agent node. By the $50^{th}$ iteration determined by each agent node, the state estimation has converged. It is important to note that while process 400 requires more iterations to converge, the number of agent nodes and the ticker period lengths may be structured such that process 400 takes less time to converge than process 200. As the number of agent nodes increases, process 200 takes more time to converge. Therefore, it is advantageous to use process 200 for smaller sets of agent nodes and process 400 for larger sets of agent nodes.

Figure 7:
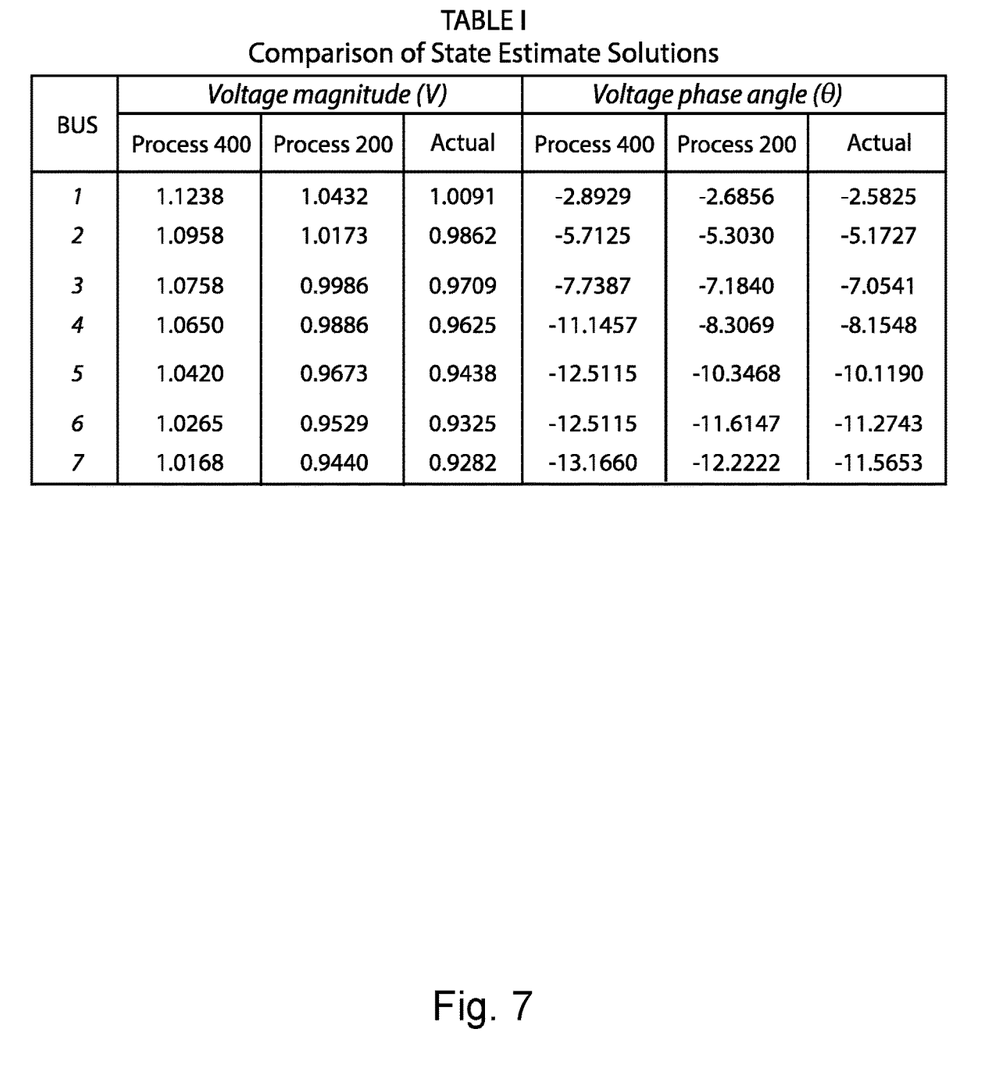
FIG. 7 is a table illustrating state estimation results in the exemplary microgrid of FIG. 1 based on the exemplary processes illustrated in FIGS. 2 and 4.

With reference to FIG. 7, there is a table illustrating microgrid state estimation results using node intercommunication based on exemplary process 200 and exemplary process 400. Each row of the table includes estimation and actual values of the voltage magnitude and phase angle of a bus in a microgrid. Despite performing state estimation using an asynchronous communication network, the states estimation results of process 200 and process 400 correspond to the actual values being estimated by the state estimation.

Further written description of a number of exemplary embodiments shall now be provided. One embodiment is a method comprising: determining, with a plurality of agent nodes structured to communicate asynchronously in a distributed system, a first set of iterations including an iteration determined by each of the plurality of agent nodes; determining, with a first agent node of the plurality of agent nodes, a local vector clock; receiving, with the first agent node, a first iteration of the first set of iterations and a remote vector clock determined based on the first iteration; updating, with the first agent node, the local vector clock based on the received remote vector clock; and determining, with the first agent node, a first iteration of a second set of iterations based on the first set of iterations after determining all iterations of the first set of iterations have been received based on the local vector clock.

In certain forms of the foregoing method, the local vector clock includes a plurality of elements, wherein a first element of the local vector clock corresponds to a number of iterations determined with the first agent node, and wherein each of the remaining elements of the local vector clock corresponds to a number of received iterations determined by one of the other agent nodes. In certain forms, the method further comprises transmitting, with the first agent node, the first iteration of the first set of iterations and the updated local vector clock in response to determining all iterations of the first set of iterations determined by the other agents nodes have not been received. In certain forms, determining, with the first agent node, the first iteration of the second set of iterations occurs in response to the first agent node determining the first iteration is not a final iteration, and wherein the method comprises updating the local vector clock based on the first iteration of the second set of iterations, and transmitting, with the first agent node, the first iteration of the second set of iterations and the local vector clock updated based on the first iteration of the second set of iterations. In certain forms, the first iteration of the second set of iterations is determined by the first agent node before at least one agent node of the plurality of agent nodes has received all iterations of the first set of iterations. In certain forms, the plurality of agent nodes is structured to communicate without being synchronized to a common time source. In certain forms, the method further comprises repeatedly receiving iterations, updating the local vector clock, and determining a new iteration based on the local vector clock until the first agent node determines the most recently determined iteration is a final iteration. In certain forms, the plurality of agent nodes are microgrid controllers, wherein the final iteration is a state estimation, and wherein the method comprises operating, with the first agent node, a controllable device of a microgrid based on the final iteration. In certain forms, the plurality of agent nodes are industrial automation controllers, wherein the final iteration is a state estimation, and wherein the method comprises operating, with the first agent node, a controllable device of an industrial automation system based on the final iteration.

Another exemplary embodiment is a distributed system comprising: a plurality of agent nodes including a first agent node; and a communication network structured to allow the plurality of agent nodes to communicate asynchronously; wherein the plurality of agent nodes each include a set of instructions stored on a memory device which, when executed by a processing device of the corresponding agent node, is effective to determine a first set of iterations including an iteration determined by each of the plurality of agent nodes, wherein the first agent node is structured to execute the set of instructions stored on the memory device of the first agent node with the processing device of the first agent node effective to: determine a local vector clock; receive a first iteration of the first set of iterations and a remote vector clock determined based on the first iteration; update the local vector clock based on the received remote vector clock; and determine a first iteration of a second set of iterations based on the first set of iterations after determining all iterations of the first set of iterations have been received based on the local vector clock.

Another exemplary embodiment is a method comprising: operating a distributed system including a first agent node and a plurality of agent nodes structured to communicate asynchronously; determining, with each agent node of the plurality of agent nodes, a plurality of iterations separated in time by a plurality of ticker periods; determining, with the first agent node, a trust matrix including a plurality of trust factors, each trust factor corresponding to a weight applied to iterations of the plurality of iterations determined by one of the plurality of agent nodes; determining, with the first agent node, a first iteration; receiving, with the first agent node, a portion of the plurality of iterations determined by a portion of the plurality of agent nodes during a first ticker period beginning after the first iteration; updating, with the first agent node, the trust matrix based on the portion of the plurality of iterations; and determining, with the first agent node, a second iteration after the first ticker period based on the portion of the plurality of iterations and the updated trust matrix.

In certain forms of the foregoing method, the method further comprises determining, with the first agent node, a second plurality of iterations including the first iteration and the second iteration, the plurality of iterations being separated in time by a second plurality of ticker periods, wherein the second plurality of ticker periods are each equal in length of time. In certain forms, a portion of the ticker periods of the first plurality of ticker periods are a length in time different than the length of time of the ticker periods of the second plurality of ticker periods. In certain forms, updating the trust matrix is based on the portion of the plurality of iterations received during the first ticker period includes decreasing any weight applied to iterations received from a remainder of the plurality of agents nodes that did not transmit an iteration to the first agent node during the ticker period. In certain forms, updating the trust matrix based on the portion of the plurality of iterations received during the first ticker period includes increasing the weight applied to iterations determined by the first agent node in an amount equal to the amount any weights were decreased. In certain forms, the method further comprises determining a step size based on the portion of the plurality of iterations received during the first ticker period, wherein determining the second iteration after the first ticker period is based in part on the determined step size. In certain forms, the first iteration, the second iteration, and the plurality of iterations are determined by the plurality of agent nodes based on recursive least squares. In certain forms, the first iteration, the second iteration, and the plurality of iterations are state estimations, and wherein the method further comprises determining, with the first agent node, a series of iterations including the first iteration and the second iteration until the first agent node determines a final iteration. In certain forms, the plurality of agent nodes are microgrid controllers, wherein the final iteration is a final state estimation, and wherein the method comprises operating, with the first agent node, a controllable device of a microgrid based on the final iteration.

A further exemplary embodiment is a distributed system comprising: a first agent node; a plurality of agent nodes; and a communication network structured to allow the first agent node and the plurality of agent nodes to communicate asynchronously; wherein the plurality of agent nodes each include a first set of instructions stored on a first memory device which, when executed by a first processing device of the corresponding agent node, is effective to determine a plurality of iterations separated in time by a plurality of ticker periods, wherein the first agent node is structured to execute a second set of instructions stored on a second memory device of the first agent node with a second processing device of the first agent node effective to: determine a trust matrix including a plurality of trust factors, each trust factor corresponding to a weight applied to iterations of the plurality of iterations determined by one of the plurality of agent nodes, determine a first iteration, receive a portion of the plurality of iterations determined by a portion of the plurality of agent nodes during a first ticker period beginning after the first iteration, update the trust matrix based on the portion of the plurality of iterations, and determine a second iteration after the first ticker period based on the portion of the plurality of iterations and the updated trust matrix.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. A method comprising:
   determining, with a plurality of agent nodes structured to communicate asynchronously in a distributed system, a first set of iterations including an iteration determined by each of the plurality of agent nodes, the plurality of agent nodes being a microgrid control system, a microgrid controller, or an industrial automation controller;
   determining, with a first agent node of the plurality of agent nodes, a local vector clock;
   receiving, with the first agent node, a first iteration of the first set of iterations and a remote vector clock determined based on the first iteration;
   updating, with the first agent node, the local vector clock based on the received remote vector clock; and
   determining, with the first agent node, a first iteration of a second set of iterations based on the first set of iterations after determining all iterations of the first set of iterations have been received based on the local vector clock;
   wherein the local vector clock includes a plurality of elements, wherein a first element of the local vector clock corresponds to a number of iterations determined with the first agent node, and wherein each of the remaining elements of the local vector clock corresponds to a number of received iterations determined by one of the other agent nodes.

2. The method of claim 1, further comprising transmitting, with the first agent node, the first iteration of the first set of iterations and the updated local vector clock in response to determining all iterations of the first set of iterations determined by the other agents nodes have not been received.

3. The method of claim 1, wherein determining, with the first agent node, the first iteration of the second set of iterations occurs in response to the first agent node determining the first iteration is not a final iteration, and wherein the method comprises updating the local vector clock based on the first iteration of the second set of iterations, and transmitting, with the first agent node, the first iteration of the second set of iterations and the local vector clock updated based on the first iteration of the second set of iterations.

4. The method of claim 1, wherein the first iteration of the second set of iterations is determined by the first agent node before at least one agent node of the plurality of agent nodes has received all iterations of the first set of iterations.

5. The method of claim 1, wherein the plurality of agent nodes is structured to communicate without being synchronized to a common time source.

6. The method of claim 1, further comprising repeatedly receiving iterations, updating the local vector clock, and determining a new iteration based on the local vector clock until the first agent node determines the most recently determined iteration is a final iteration.

7. The method of claim 6, wherein the plurality of agent nodes are microgrid controllers, wherein the final iteration is a state estimation, and wherein the method comprises operating, with the first agent node, a controllable device of a microgrid based on the final iteration.

8. The method of claim 6, wherein the plurality of agent nodes are industrial automation controllers, wherein the final iteration is a state estimation, and wherein the method comprises operating, with the first agent node, a controllable device of an industrial automation system based on the final iteration.

9. A distributed system comprising:
   a plurality of agent nodes including a first agent node, the plurality of agent nodes being a microgrid control system, a microgrid controller, or an industrial automation controller; and
   a communication network structured to allow the plurality of agent nodes to communicate asynchronously;
   wherein the plurality of agent nodes each include a set of instructions stored on a memory device which, when executed by a processing device of the corresponding agent node, is effective to determine a first set of iterations including an iteration determined by each of the plurality of agent nodes, wherein the first agent node is structured to execute the set of instructions stored on the memory device of the first agent node with the processing device of the first agent node effective to:

determine a local vector clock;

receive a first iteration of the first set of iterations and a remote vector clock determined based on the first iteration;

update the local vector clock based on the received remote vector clock; and determine a first iteration of a second set of iterations based on the first set of iterations after determining all iterations of the first set of iterations have been received based on the local vector clock;

wherein the local vector clock includes a plurality of elements, wherein a first element of the local vector clock corresponds to a number of iterations determined with the first agent node, and wherein each of the remaining elements of the local vector clock corresponds to a number of received iterations determined by one of the other agent nodes.

10. A method, comprising:

determining, with a first agent node, a first iteration in a first set of iterations, the first agent node being the first agent node in a plurality of agent nodes of a distributed system communicating asynchronously, the first set of iterations comprising iterations determined by each of the plurality of agent nodes and the plurality of agent nodes being a microgrid control system, a microgrid controller, or an industrial automation controller;

determining, with the first agent node, a local vector clock;

receiving, with the first agent node, a respective iteration of the first set of iterations;

receiving, with the first agent node, a remote vector clock determined based on the respective iteration;

updating, with the first agent node, the local vector clock based on the received remote vector clock; and determining, with the first agent node, a first iteration of a second set of iterations based on the first set of iterations, the determining being after determining that all iterations of the first set of iterations have been received based on the local vector clock:

wherein the local vector clock includes a plurality of elements, wherein a first element of the local vector clock corresponds to a number of iterations determined with the first agent node, and wherein each of the remaining elements of the local vector clock corresponds to a number of received iterations determined by one of the other agent nodes.

11. The method of claim 10, the method further comprising transmitting, with the first agent node, the first iteration of the first set of iterations and the updated local vector clock in response to determining all iterations of the first set of iterations determined by the other agents nodes have not been received.

12. The method of claim 10, wherein determining, with the first agent node, the first iteration of the second set of iterations occurs in response to the first agent node determining the first iteration is not a final iteration, and wherein the method comprises updating the local vector clock based on the first iteration of the second set of iterations, and transmitting, with the first agent node, the first iteration of the second set of iterations and the local vector clock updated based on the first iteration of the second set of iterations.

13. A distributed system, comprising:

a plurality of agent nodes configured to communicate asynchronously in the distributed system, the plurality of agent nodes being a microgrid control system, a microgrid controller, or an industrial automation controller, the plurality of agent nodes configured to determine a first set of iterations including an iteration determined by each agent node, wherein a first agent node of the plurality of agent nodes is configured to:

determine a local vector clock;

receive a first iteration of the first set of iterations;

receive a remote vector clock determined based on the first iteration;

update the local vector clock based on the received remote vector clock; and determine a first iteration of a second set of iterations based on the first set of iterations after determining all iterations of the first set of iterations have been received based on the local vector clock;

wherein the local vector clock includes a plurality of elements, wherein a first element of the local vector clock corresponds to a number of iterations determined with the first agent node, and wherein each of the remaining elements of the local vector clock corresponds to a number of received iterations determined by one of the other agent nodes.

14. The distributed system of claim 13, wherein the first agent node is further configured to transmit the first iteration of the first set of iterations and the updated local vector clock in response to determining all iterations of the first set of iterations determined by the other agents nodes have not been received.

15. The distributed system of claim 13, wherein the first agent node is further configured to:

determine that the first iteration of the second set of iterations occurs in response to the first agent node determining the first iteration not being a final iteration;

update the local vector clock based on the first iteration of the second set of iterations; and transmit the first iteration of the second set of iterations and the local vector clock updated based on the first iteration of the second set of iterations.

16. The distributed system of claim 13, wherein the first iteration of the second set of iterations is determined by the first agent node before at least one agent node of the plurality of agent nodes has received all iterations of the first set of iterations.

17. The distributed system of claim 13, wherein the plurality of agent nodes communicate asynchronously without being synchronized to a common time source.

* * * * *